United States Patent [19]

Molnar

[11] Patent Number: 5,046,188
[45] Date of Patent: Sep. 3, 1991

[54] DATA INTERFACE FOR TELEPHONE SYSTEM

[75] Inventor: Gerald Molnar, Ottawa, Canada

[73] Assignee: Trillium Telephone Systems, Inc., Ontario, Canada

[21] Appl. No.: 313,036

[22] Filed: Feb. 21, 1989

[30] Foreign Application Priority Data

Mar. 1, 1988 [CA] Canada ................................. 560245

[51] Int. Cl.⁵ ...................... H04M 11/00; H04M 3/42
[52] U.S. Cl. ........................................ 379/94; 379/201
[58] Field of Search .................... 379/94, 96, 201, 216, 379/93

[56] References Cited

U.S. PATENT DOCUMENTS

| | | | |
|---|---|---|---|
| 4,291,198 | 9/1981 | Anderson et al. | 379/96 |
| 4,330,886 | 5/1982 | Fukuda et al. | 379/93 |
| 4,506,111 | 3/1985 | Takenouchi et al. | 379/96 |
| 4,640,989 | 2/1987 | Riner et al. | 379/94 |
| 4,653,085 | 3/1987 | Chan et al. | 379/94 |
| 4,707,694 | 11/1987 | Bauer et al. | 379/94 |

OTHER PUBLICATIONS

Zymacom, "Zymacom Information Exchange", pp. 1–9, ©1985.

Primary Examiner—Jin F. Ng
Assistant Examiner—Wing F. Chan
Attorney, Agent, or Firm—Antonelli, Terry, Stout & Kraus

[57] ABSTRACT

A data interface for use in a communication system, comprised of a CPU module connected to a central controller of the communication system and a plurality of data terminals associated with respective subscriber sets of the communication system. The CPU module communicates with the central controller in response to user initiated requests at the respective data terminals, and executes telephone special features in association with the respective sets, such as dial-by-name, etc. The CPU module can also be connected to a personal computer, for interfacing the data terminals therewith on a time sharing basis. Furthermore, the CPU module functions as a data switch for implmenting electronic mail between the data terminals within the communication system. A communications module incorporating modems and Telex TM interfaces can be connected to the CPU module for establishing communication between the data terminals and one or more outside telephone lines via the communication system.

13 Claims, 4 Drawing Sheets

DATA INTERFACE FOR TELEPHONE SYSTEM

FIELD OF THE INVENTION

This invention relates in general to communication systems, and more particularly to a data port interface for integrating voice and data functions within a communication system.

BACKGROUND OF THE INVENTION

Recent efforts in research and development in the telecommunications industry have concentrated on establishing integrated voice and data within communication systems such as key telephone systems and PABXs. For example, the Kontact TM work station manufactured by Mitel Corporation, offers an integrated subscriber set and personal computer. Special features such as "dial-by-name" can be implemented by the Mitel device, along with standard personal computer features such as word processing, spread-sheet programs, etc. Also, data communication to outside telephone lines is implemented by means of an onboard modem.

Other integrated voice and data telephone sets are also well known. For example, U.S. Pat. No. 4,322,581 (Christain et al) discloses an integral voice and data set for use with common equipment in a telephone network. However, the system disclosed in Christain et al, as well as the above described Mitel device suffer from the disadvantage that each data set requires a dedicated microprocessor and associated peripheral circuitry, such as memory units, floppy disks, modems, etc. Hence, such prior art voice and data sets have been found to be expensive and of complex construction and design.

Additional voice and data systems are known in which both voice and data signals are transmitted in digital form and routed via sophisticated and expensive digital time/space crosspoint switches, and multiplex circuitry. Such systems are described for example in U.S. Pat. Nos. 4,160,131 (Kaul et al) and 4,627,046 (Bellamy), and elsewhere in numerous publications and articles relating to ISDN (Integrated System Digital Network) type systems.

While such prior integrated digital voice and data systems provide standard interfaces between various manufacturers as well as accurate and efficient performance, the circuitry required for implementing such systems is generally expensive and highly complex.

Other prior art systems are known which teach voice and data communication within a single system. For example, U.S. Pat. No. 4,440,986 (Thorson) relates to a microprocessor controller having a central processor for controlling a PBX and also separately controlling operation of a plurality of data terminals to provide a general computing capability. According to Thorson, the functions of PBX and data communications are separate and not integrated. In particular, the general computing function is defined as being unrelated to the operation of the telephone system.

Additional prior art of interest is disclosed in U.S. Pat. Nos. 4,096,359 (Barselotti); 4,140,885 (Varehagen) and 4,506,346 (Bennett et al).

SUMMARY OF THE INVENTION

In an effort to overcome the disadvantages of the above discussed prior art, the data interface according to the present invention utilizes a CPU module which is time-shared between a plurality of non-intelligent data terminals associated with respective subscribers sets within a communication system. A central controller supervises call processing throughout the system, and the CPU module communicates with the central controller for implementing predetermined telephone special features associated with operation of the subscribers sets in response to user initiation of the features at the respective data terminals.

Thus, in contrast with the system of Thorson, the present invention integrates voice and data function within the communication system, such that the user is able to influence operation of the telephone features from his or her data terminal. However, in contrast with the first mentioned prior art systems, only a single CPU module is required, which is time-shared between the various data terminals, thereby minimizing the complexity and expense of the system. In contrast with the Mitel device, and the systems of Christain, Bellamy and Kaul et al, the data terminals of the present invention contain no expensive computing circuitry such as microprocessors, semiconductor memories, modems, etc.

Thus, the system according to the present invention provides integrated voice and data functions similar to those provided by expensive digital communication systems, yet is implemented within an inexpensive analog telephone system such as a PABX or key telephone system, utilizing standard data terminals. Almost all of the advanced features found in expensive and complex ISDN systems may be achieved according to the present invention, at a fraction of the cost.

According to an alternative embodiment of the invention, a communications module is provided, including a modem and Telex TM circuitry for providing data communication between the data terminals and one or more outside lines under control of the CPU module.

BRIEF DESCRIPTION OF THE DRAWING

A better understanding of the present invention will be obtained with reference to the detailed description below in conjunction with the following drawings, in which.

DETAILED DESCRIPTION OF THE PREFERRED EMBODIMENT

Figure 1:
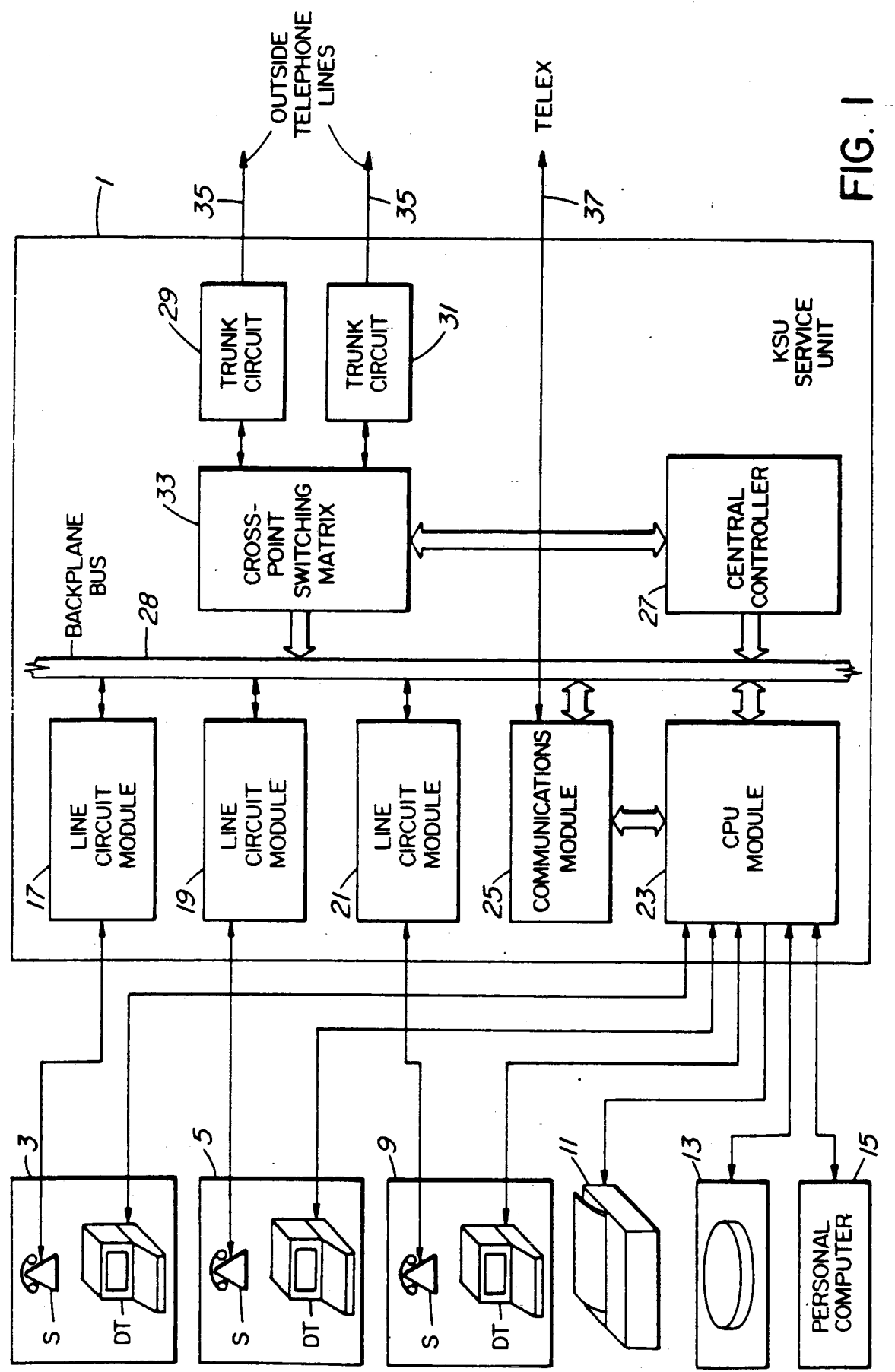
FIG. 1 is a block diagram of a key telephone system incorporating a data interface in accordance with the present invention in its most general form.

Turning to FIG. 1, a key telephone system is shown comprised of a key service unit KSU 1, connected to a plurality of subscriber stations 3, 5 and 9, a printer 11, a hard disk drive (database) 13 and a personal computer 15.

Although only three subscriber stations 3, 5 and 9 are illustrated for convenience, a greater number of subscriber stations would be included in the typical key telephone system.

Each of the subscriber stations 3, 5 and 9 is comprised of a subscriber set S, such as a key system proprietary telephone set, or alternatively a model 500 type telephone set, and a data terminal DT, or other non-intelligent terminal, such as a VT-100 TM or Decscope TM terminal manufactured by Digital Equipment Corporation.

Each of the subscriber sets S is shown connected to a corresponding line circuit 17, 19 and 21, and the data terminals DT are connected to a CPU module 23. The printer 11, disk drive 13 and personal computer 15 are also connected to the CPU module 23.

A communications module 25 is shown connected to the CPU module 23, and is preferably comprised of one or more modems and/or Telex TM circuits, as discussed in greater detail below with reference to FIG. 3.

Each of the line circuits 17, 19 and 21, as well as communications module 25 and CPU module 23 are connected to a backplane bus 28.

Operation of the KSU 1 is supervised by a central controller 27 executing a call processing program for controlling interconnection of the line circuits 17-21 and trunk circuits 29 and 31. The trunk circuits 29 and 31 are connected via outside telephone lines 35 to remote central offices, PBXs or other KSUs, etc.

During normal operation of the KSU 1, analog audio signals are bi-directionally translated between the subscribers' sets S of respective ones of the subscriber stations 3-9 via line circuits 17-21 and crosspoint switching matrix 33, under control of central controller 27. Also, predetermined ones of the subscribers' sets S can be connected through the respective line circuits and crosspoint switching matrix 33 to predetermined ones of the trunk circuits 29, 31 for application to the outside telephone lines 35, also under control of central controller 27.

According to the present invention CPU module 23 provides an interface between respective ones of the data terminals DT, the printer 11, disk drive unit 13 and personal computer 15. In particular, CPU module 23 executes data interface software for establishing data communication between respective ones of the data terminals DT, thereby providing a messaging capability within the key telephone system. The combination of at least the CPU, data terminals, data interface software and interfaces to the central controller and line circuits forms a data interface.

For example, a subscriber at station 3 may wish to transmit an electronic mail (e-mail) message to the subscriber at station 9, regardless of whether or not a voice communication path is also established between the respective subscriber sets S via the crosspoint switching matrix 33. In operation, the subscriber at station 3 formats the message on data terminal DT which, as discussed above, typically includes no sophisticated computing hardware, and transmits the message to the CPU module 23 via a RS-232, or other suitable data line. The CPU module 23 functions as a data switch for receiving the message from station 3, storing, and retransmitting the message to appear at station 9.

According to a second mode of operation, CPU module 23 receives digital command signals from a predetermined one or more of the data terminals DT for initiating a telephone special feature, such as dial-by-name. For example, in the event the subscriber at station 5 executes a dial-by-name command instruction at his or her data terminal DT, CPU module 23 receives the special feature request signal and transmits a directory of names for display at the subscriber's data terminal DT. The subscriber then selects a name and initiates out-dialling by inputting the command "dial", or other suitable command. The CPU module 23 interprets the command from the terminal as a request to implement a speed dial feature of the number associated with the name selected from the directory. In response, the CPU module 23 generates a further command to the central controller 27 which thereafter connects the subscriber set S to one of the outside telephone lines 35 via one of the trunk circuits 29, 31 and crosspoint switching matrix 33, and generates DTMF or dial pulse signals corresponding to the desired speed dial number, for application to the predetermined trunk circuit 29, 31 and thereafter to the outside telephone lines 35.

In this mode, the CPU module 23 interacts with central controller 27 for implementing telephone special features, such as those typically found in the prior art Kontact TM workstation of Mitel Corporation, discussed above.

According to a further mode of operation, the various data terminals DT associated with respective subscriber stations 3, 5 and 9 are connected on a time-sharing basis to one or more common peripherals such as the printer 11, hard disk drive unit 13 (or other data base), and personal computer 15. In this way, full computing power is furnished to respective ones of the data terminals DT, under control of the CPU module 23, yet the data terminals themselves are of inexpensive design and construction, containing no intelligent hardware such as microprocessors, etc.

According to yet another mode of operation, external data communication channels are established via the communications module 25 in conjunction with the CPU module 23, for connecting the data terminals DT at the respective subscriber stations 3, 5 and 9, to the outside telephone lines 35 or other telecommunication lines such as a Telex TM line 37. For example, the communications module 25 may be comprised of one or more modems for modulating data signals generated by the data terminals DT, and applying the modulated signals to the outside telephone lines 35 via the crosspoint switching matrix 33 and respective trunk circuits 29 and 31. Similarly, modulated signals may be received from a remote modem by the module 25, via telephone lines 35, switch 33 and trunk circuits 29 and 31, and demodulated and displayed at terminal DT.

Alternatively, the data terminals DT may be connected to a Telex TM transmitter/receiver within communications module 25, for receiving and transmitting messages via Telex TM line 37.

In fact, the communications module 25, in conjunction with CPU module 23, may accommodate a variety of communication means such as Tymnet TM, Vaxmail TM, Envoy 100 TM, Telex TM etc. The subscriber types or otherwise enters a message into his or her data terminal, enters a command to send the massage, and in response CPU module 23 generates a directory or list of the various communications media available. The subscriber selects one of the communications media (e.g. Envoy 100 TM), and the CPU module 23 automatically connects a modem within communications module 25 to the selected trunk circuit 29 or 31 and generates the required dialling digits for logging onto the system, thereby completing the connection between the data terminal DT and the selected communication medium.

Furthermore, the CPU module 23 may connect the printer 11 for receiving incoming signals from the communications module 25 in order to generate a hard copy print out of received messages or text. For example, the CPU module 23 may be programmed to read and print received electronic mail for respective ones of the subscriber stations 3, 5 and 9 every morning at 7:30 a.m.

In summary, according to the present invention, an integrated voice and data system is provided, allowing access from subscriber station 3, 5 and 9 to other subscriber stations within the key telephone system, as well as to external subscribers via the outside telephone lines 35 and Telex TM line 37 in a manner completely transparent to the subscriber.

Furthermore, according to the present invention, various telephone special features such as dial-by-name, call forward, call back and last number redial, can be implemented on standard type-500 sets from the associated data terminals, without the requirement for sophisticated and expensive proprietary subscriber sets.

In addition, each data terminal can display information such as appointments, calendar, dialled number display, call timer, call waiting, call announce, busy lamp field, etc., in response to execution of appropriate software by CPU module 23. Such features are normally associated only with expensive proprietary subscriber sets or operator consoles.

Figure 2:
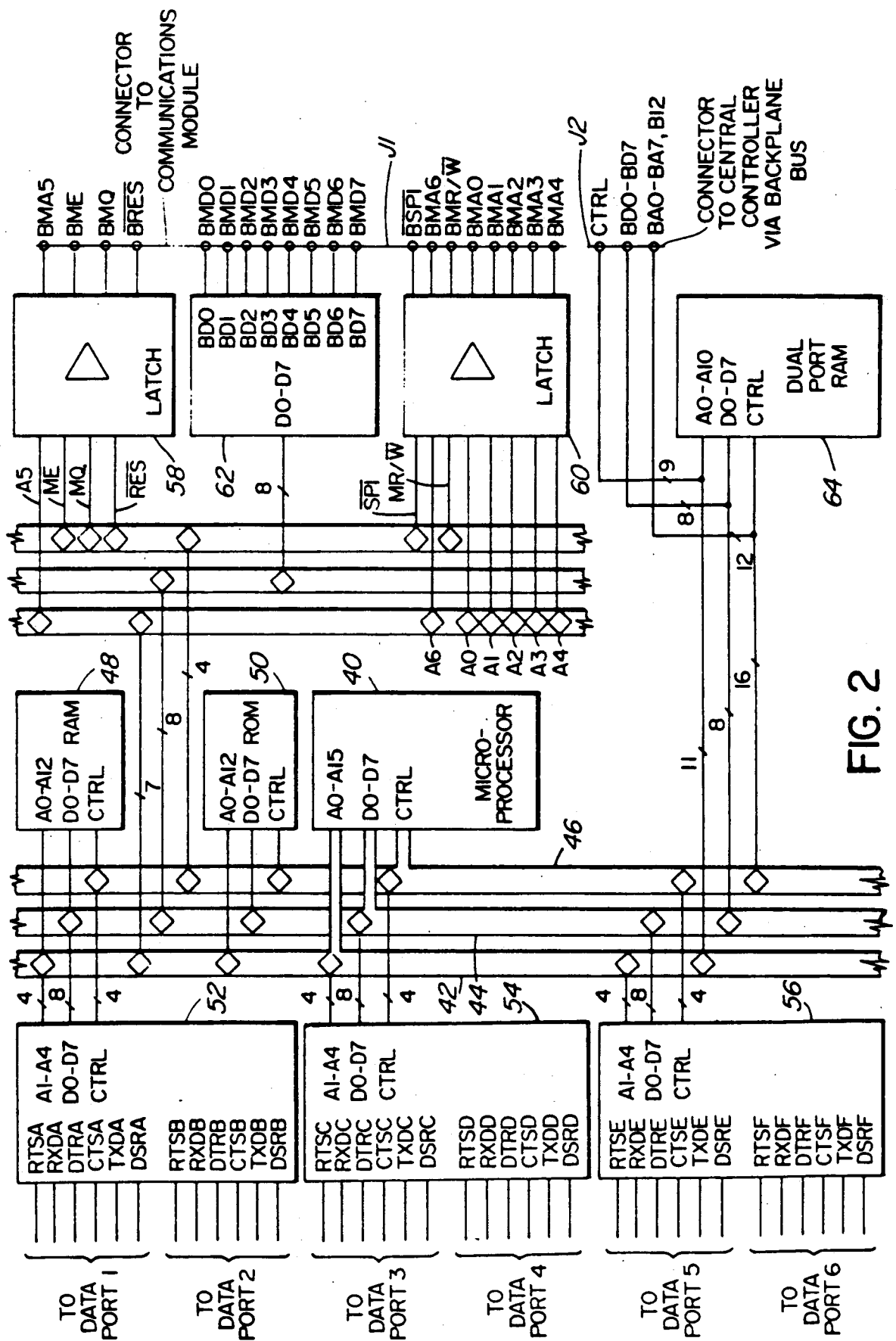
FIG. 2 is a schematic diagram of a CPU module in the data interface of FIG. 1, connected to a central controller of the key telephone system, according to a preferred emodiment of the present invention.

Turning now to FIG. 2, the CPU module 23 is shown in greater detail comprised of a microprocessor 40 having address terminals A0-A15 connected to an address bus 42, data terminals D0-D7 connected to a data bus 44 and control terminals CTRL (e.g. IRQ, RESET, HALT, etc.), connected to a control bus 46, in a well known manner.

A random access memory RAM 48 is connected to the address, data and control buses via address inputs A0-A12, data terminals D0-D7 and control terminals CTRL, respectively. According to a successful prototype of the present invention, RAM 48 was comprised of three 3 8k×8 DRAM circuits connected via decoding logic circuitry to the microprocessor 40.

A read only memory ROM 50 is also connected to the address, data, and control buses via address terminals A0-A12, data terminals D0-D7 and control terminals CTRL, respectively. According to the successful prototype, ROM 50 was comprised of a 256 k EPROM.

Three dual-port UARTs 52, 54 and 56 are provided each having address terminals A1-A4, data terminals D0-D7 and control terminals CTRL connected to the address, data and control buses, respectively, of the microprocessor 40. The RTS, RXD, DTR, DTS, TXD and DSR terminals of UARTs 52, 54 and 56 comprise a standard RS-232 serial data for communication with the respective data ports, such as data terminals DT, printer 11, disk drive unit 13 and personal computer 15 (FIG. 1).

Also connected to the address, data and control buses 42, 44 and 46, are a pair of unidirectional latches 58 and 60, and a bi-directional latch 62, each of which is connected to a backplane cohnector J1 connected to the communications module 25 and central controller 27 (FIG. 1).

In particular, address lead A5 is buffered by latch 58 for connection to the BMA 5 terminal of connector J1. Similarly, control leads ME, MQ and $\overline{RES}$ are buffered for application to the BME, BMQ and $\overline{BRES}$ terminals of connector J1.

Likewise, the SP1 and MR/W control leads, and the A0-A6 address leads are buffered via latch 60 for application to the $\overline{BSP1}$, BMR/$\overline{W}$ and BMA0-6 terminals respectively, of connector J1.

Respective leads of the data bus 44 are connected to bi-directional terminals D0-D7 of latch 62 which buffers the signals and applies the buffered signals to the BMD0-BMD7 terminals of connector J1.

Also, a dual port RAM 64 has address inputs A0-A10, data terminals D0-D7 and control CTRL terminals connected to address, data and control buses 42, 44 and 46 respectively, as well as to the BA0-BA7, B12, BD0-BD7 and CTRL terminals of a second connector J2 for connection to the central controller 27 (i.e. via backplane bus 28 in FIG. 1). The dual port RAM 64 forms an interface between the CPU module 23 and the central controller 27, as described in greater detail below.

By way of example, operation of the CPU module 23 will be described for performing a telephone special feature such as dial-by-name. In the event the subscriber at station 5 (FIG. 1) wishes to implement the dial-by-name special feature, he or she enters the appropriate command (e.g. "DIAL-BY-NAME") into his or her data terminal DT. The data terminal DT communicates with UART 52 using hand-shaking logic, via the serial RS-232 interface comprising data leads RSTB, RXDB, DTRB, CTSB, TXDB and DSRB (FIG. 2), in a well known manner.

The UART 52 converts the serial format digital command signal into parallel form for application to data bus 44 via data terminals D0-D7.

Microprocessor 40 is interrupted via the UART 52 by means of an interrupt request signal generated by the terminal DT and transmitted to an interrupt input (not shown) of the microprocessor 40 via the control bus 46. In response, microprocessor 40 executes a predetermined call processing software routine stored in ROM 50 for accessing a dial-by-name directory stored in RAM 48.

The directory data stored in RAM 48 is applied to the D0-D7 terminals of UART 52 under control of microprocessor 40, translated into serial format, and transmitted for display at the data terminal DT (i.e. DATA PORT 2) of subscriber station 5, via the RS-232 interface, as described above.

The subscriber selects one of the names from the directory, and an indication of the selected name is transmitted from the data terminal DT via the RS-232 port and UART 52, to the microprocessor 40. In response, microprocessor 40 executes a further software subroutine stored in ROM 50, for transmitting address, data and control signals to the central controller 27 (FIG. 1) via dual port RAM 64.

More particularly, the address, data and control signals generated by microprocessor 40, are stored in dual port RAM 64 in the form of data signals. Central controller 27 (FIG. 1), periodically reads the data stored in RAM 64 and in response executes appropriate software for implementing the special feature in accordance with the received data. Contention between the microprocessor 40 and controller 27 for control of dual port RAM 64 is prevented by means of hand-shaking access control utilizing RAM request and acknowledge control signals, in a well known manner.

In particular, predetermined address, data and control signals are retrieved from RAM 64 by the central controller 27, which in response configures the crosspoint switching matrix 33 (FIG. 1) to connect the subscriber set S associated with station 5, via line circuit 19 to an idle one of the trunk circuits 29 or 31. Next, microprocessor 40 reads further data signals from the RAM 48 corresponding to the 7 or 9 digit telephone number associated with the selected directory name. These further data signals are transmitted to the central controller 27 via dual port RAM 64 and connector J2 as discussed above. The central controller 27 then generates the appropriate DTMF or dial pulse signals for application to the selected trunk circuit 29 or 31, and subsequent application to the selected one of the outside telephone lines 35.

Thus, the dial-by-name telephone special feature is implemented at the subscriber station 5 utilizing an inexpensive data terminal DT, without the requirement for sophisticated voice and data work stations, or digital voice and data switching systems, etc., as in the prior art.

Figure 3:
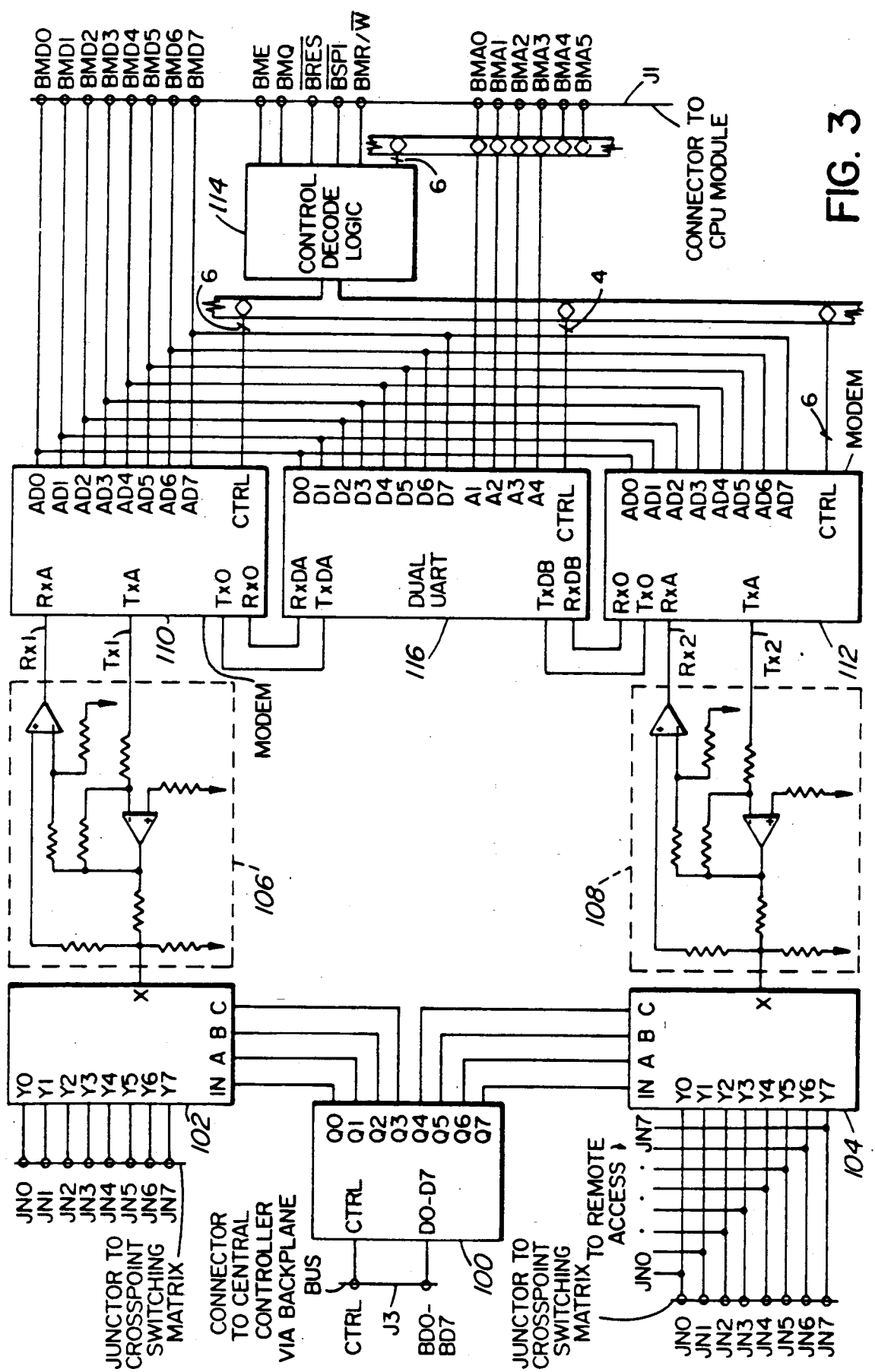
FIG. 3 is a schematic diagram of a communications module for use in conjunction with the CPU module, according to an alternative embodiment of the present invention.

Turning now to FIG. 3, a block schematic diagram illustrates the structure of communications module 25 (FIG. 1) shown connected to the CPU module 23 and central controller 27.

A unidirectional latch 100 has D0-D7 inputs connected to the BD0-BD7 data terminals of central controller 27, via connector J3 (e.g. backplane bus 28 in FIG. 1). Also, control terminals of the central controller 27 are connected to the CTRL terminal of latch 100 for receiving clock and enable signals, etc. The Q0-Q3 outputs of latch 100 are connected to inhibit (IN) and select inputs A, B and C, respectively, of a selector/multiplexer 102. Likewise, outputs Q4-Q7 of latch 100 are connected to the C, B, A and IN inputs of a further selector/multiplexer 104.

The bidirectional Y0-Y7 terminals of selector/multiplexers 102 and 104 are connected to the JN0-JN7 junctor terminals of crosspoint switching matrix 33 (FIG. 1), and the bidirectional X terminals are connected to respective hybrid circuits 106 and 108 of well known design.

Receive and transmit leads RX1, TX1 and RX2, TX2 of hybrids 106 and 108, respectively, are connected to respective RXA and TXA terminals of modems 110 and 112. Further transmit and receive terminals TX0 and RX0 of modems 110 and 112 are connected to the TXDA, RXDA and TXDB, RXDB terminals of a dual UART 116. Also, the AD0-AD7 parallel data terminals of modems 110 and 112 are connected to the D0-D7 terminals of UART 116.

A control decode logic circuit 114 receives BME, BMQ, BRES, BSPI and BMR/W control signals from CPU module 23 via connector J1, as well as BMA0-BMA5 address signals therefrom, and in response applies predetermined control signals to the respective CTRL terminals of modems 110 and 112, as well as dual UART 116. Furthermore, the BMA0-BMA3 address terminals are connected to the A1-A4 address inputs of dual UART 116. The AD0-AD7 terminals of modems 110 and 112 are also connected to the BMD0-BMD7 terminals of CPU module 23 via the connector J1.

By way of example, operation of the communication module 25 will be described for receiving a message from one of the data terminals DT and transmitting the message digitally to a remote data terminal or computer, etc. via the telephone lines 35.

In the event the subscriber at station 5 (FIG. 1) wishes to send a data message to a remote terminal, he or she enters the appropriate command (e.g. "external communication") into his or her data terminal DT. The data terminal DT communicates with UART 52 (FIG. 2) using handshaking logic, via the serial RS-232 interface as described in detail above.

The UART 52 converts the serial formal digital command signal into parallel form for application to data bus 44 via data terminals D0-D7.

Microprocessor 40 is interrupted via the UART 52 by means of an interrupt request signal generated by the terminal DT and transmitted to an interrupt input (not shown) of the microprocessor 40, via the control bus 46. In response, microprocessor 40 executes a predetermined special feature software routine stored in ROM 50 for accessing an external communication directory stored in RAM 48.

The directory data stored in RAM 48 is applied to the D0-D7 terminals of UART 52 under control of microprocessor 40, translated into serial format, and transmitted for display at the data terminal DT (i.e. data port 2) of subscriber station 5, via the RS-232 interface, as described above.

The subscriber selects one of the communication carriers (e.g. Tymnet TM, Vaxmail TM, Envoy 100 TM, Telex TM, etc.), and an indication of the selected carrier is transmitted from the data terminal DT via the RS-232 port and UART 52, to the microprocessor 40. In response, microprocessor 40 executes a further software sub-routine stored in ROM 50, for transmitting address, data and control signals to the central controller 27 (FIG. 1) via dual port RAM 64, as discussed above.

The central controller 27 then configures the crosspoint switching matrix 33 (FIG. 1) to connect one of the modems 110 or 112 via the associated hybrid 106 or 108 and selector/multiplexer 102 or 104 to an idle one of the trunk circuits 29 or 31. Next, microprocessor 40 reads further data signals from the RAM 48 corresponding to the 7 or 9 digit telephone number associated with the selected communication carrier. The central controller 27 then generates the appropriate DTMF or dial pulse signals for application to the selected trunk circuit, and applies the generated dialling signals to the selected one of the outside telephone lines 35.

The remote carrier communication facility generates carrier tone in response to receiving the incoming call, and transmits the carrier tone via the selected telephone line and the established communication path through crosspoint switching matrix 33 for reception by the selected one of the modems 110 or 112.

Meanwhile, the microprocessor 40 generates and stores predetermined data signals in associated registers of the selected modem, via the AD0-AD7 inputs thereof, for initializing the selected modem.

Next, message data signals are received from the data terminal DT by the CPU module 23 and transmitted therefrom via the BMD0-BMD7 terminals of connector J1 for reception by the D0-D7 terminals of UART 116. The UART 116 performs parallel-to-serial (as well as serial-to-parallel) conversion of data signals carried by the BMD0-BMD7 data lines and the RX1, TX1 or RX2, TX2 data leads connected to hybrids 106 and 108, respectively, for effecting bidirectional data communication between the remote modem and local data terminal DT, via the telephone lines 35.

Similarly, data signals received from the remote modem are received by the selected trunk circuit 29 or 31 and passed through crosspoint switching matrix 33 for demodulation via the selected modem 110 or 112. The demodulated serial format message data signal is received via one of either the RXDA or RXDB terminals of UART 116 and converted into parallel format for application to the BMD0-BMD7 terminals of connector J1. The parallel format data signals are then latched via bidirectional buffer 62 onto data bus 44 and therefrom to the data terminal DT, via UARTs 52, 54 or 56.

Timing and control of the modems 110 and 112 as well as dual UART 116 is performed by transmission of control signals (e.g. BME, BMQ, $\overline{BRES}$, $\overline{BSPI}$, BMR/$\overline{W}$), and address signals BMA0-BMA5 between the communication module 25 and CPU module 23, in a well known manner.

Thus, external electronic mail and message data signalling is accomplished by the present invention utilizing an inexpensive data terminal DT, without the requirement for sophisticated personal computing devices and dedicated modems, as in the prior art.

Figure 4:
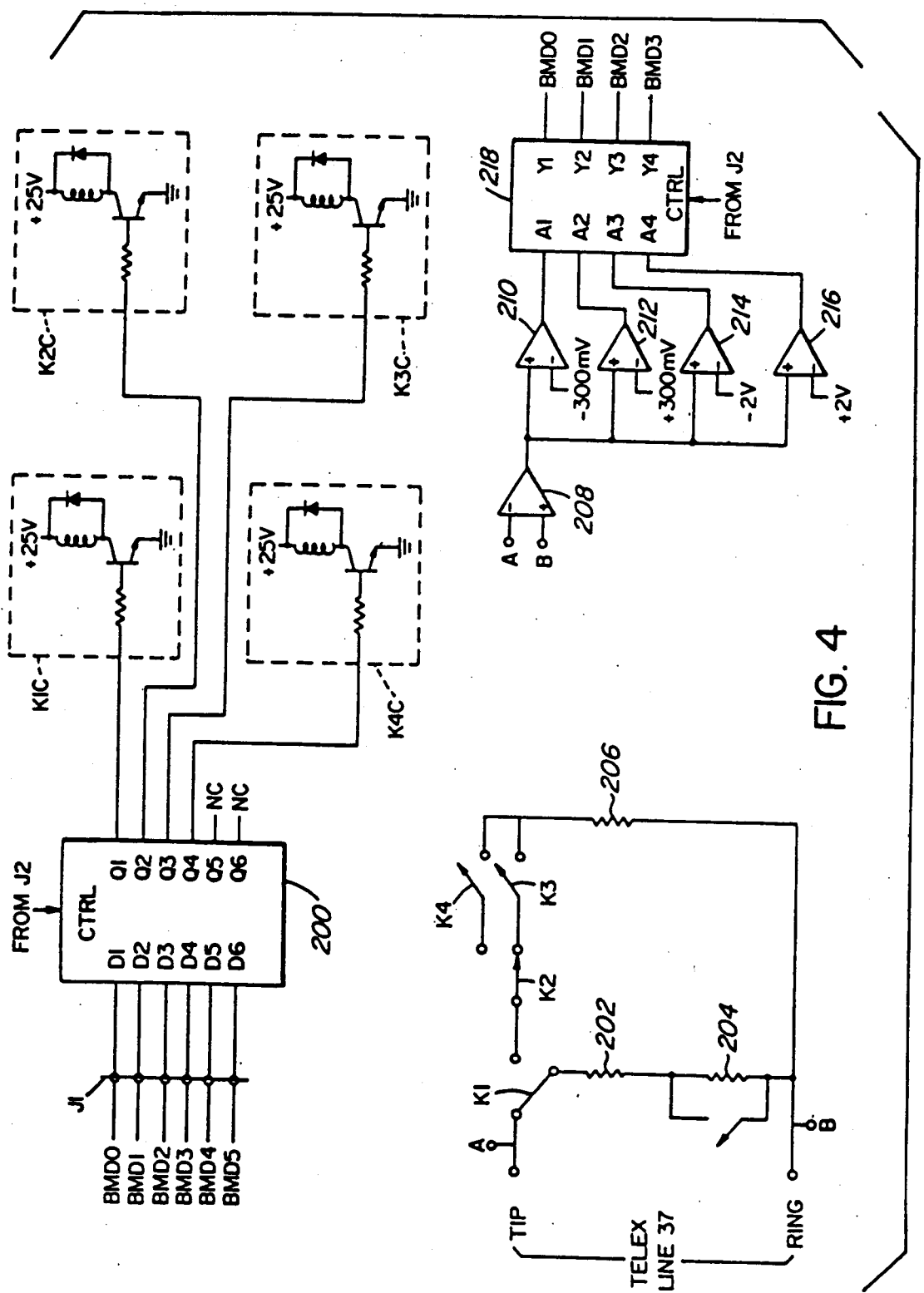
FIG. 4 is a schematic diagram of a Telex TM circuit in accordance with the alternative embodiment.

With reference to FIG. 4, a Telex TM circuit is shown, forming part of the communication module 25.

The BMD0-BMD5 data terminals of connector J1 are further connected to D1-D6 inputs of a latch 200. Q1-Q4 outputs of latch 200 are connected to relay coil energizers K1C-K4C, respectively. The relay coil energizers K1C-K4C are of well known design.

The tip lead of Telex TM line 37 is connected to a contact K1 for connecting the line 37 to an off hook or idle termination provided by one or both of resistors 202 and 204. Alternatively, in response to being energized by circuit K1C, the K1 contact connects the tip and ring leads across a DC termination resistor 206 and a combination of dialing relays K2, K3 and K4.

The K1-K4 relay contacts are activated in response to being energized by circuits K1C-K4C as a result of predetermined data signals being generated by microprocessor 40 and applied to the D1-D4 inputs of latch 200 via connector J1.

Thus, in operation, microprocessor 40 generates data signals for connecting the Telex TM line 37 to one of either the idle or active terminations, and generates further data signals for operating relay contacts K2-K4 for dialling and generating message signals for transmission along the Telex TM line 37.

Telex TM messages received from the line 37 are applied via A and B terminals to a differential amplifier 208 connected to non-inverting inputs of comparators 210, 212, 214 and 216. The differentially received signal from the Telex TM line 37 is compared with threshold voltages of −300 millivolt, 300 millivolts, −2 volts and +2 volts in respective ones of the comparators 210 and 216, for decoding the received signals. In response, the comparators 210-216 generate respective logic high or logic low level data signals for application to the A1-A4 inputs of a latch 218. The decoded data signals are transmitted to the BMD0-BMD3 data terminals of connector J1 for reception by microprocessor 40.

Thus, in summary, integrated voice and data features are provided according to the present invention in an inexpensive analog communication system, such as a key telephone system. The disadvantages of prior art digital voice and data switching, and expensive intelligent work stations are overcome by the use of a shared CPU module in conjunction with a plurality of inexpensive data terminals associated with respective subscriber stations.

External communication is provided by means of a shared communication module comprising one or more modems, Telex TM circuits, etc., for implementing electronic mail and data transmission outside the key telephone system.

A person understanding the present invention may conceive of other embodiments or variations therein.

For example, while the data interface of the present invention has been described in relation to key telephone systems, the invention can be easily implemented within a small PABX or other analog telephone system. Also, while data ports such as terminals, printers, hard disk drives, personal computers, etc. have been described herein for interconnection within the communication system via the CPU module, additional data ports such as optical disks, LANs, etc., may also be accommodated.

Also, a signal protocol conversion program can be implemented via CPU module 23 in order to convert or translate a personal computer proprietary language (i.e. executed within personal computer 15) into the proprietary operating system program language implemented by the CPU module 23, or other ones of the data ports (e.g. another personal computer), such that computer 15 can control operation of the communication system 1, or communicate with the other data ports in a manner transparent to the user.

Furthermore, while communication between the various data ports and the CPU module has been described herein as being implemented via serial RS-232 lines, other serial or parallel communication media can be utilized.

These and other variations and embodiments are considered to be within the sphere and scope of the present invention as defined in the claims appended hereto.

I claim:

1. In a communication system connecting to outside lines and comprised of local subscriber ports and a central controller for interconnecting predetermined ones of said ports and said lines; a data interface comprised of at least one data terminal which is associated with a corresponding at least one port for generating digital command signals designating predetermined special features, and a CPU module connected to said central controller and interfacing said at least one data terminal, for receiving and interpreting said digital command signals from said at least one data terminal and in response initiating execution by said central controller of said predetermined special features.

2. A data interface as defined in claim 1, wherein said local subscriber ports are comprised of subscriber sets and said special features are associated with said sets and comprised of at least one of speed dial, dial-by-name, dialed-number-display, call waiting display, call forward and call announce.

3. A data interface as defined in claim 1, further including a data communications module connected to said CPU module and to said communication system, for bidirectionally translating data signals between said at least one terminal and said outside lines under control of said CPU module in conjunction with said central controller.

4. A data interface as defined in claim 3, comprising plural ones of said data terminals wherein said at least one of said predetermined special features is comprised of establishing data communication between respective ones of said terminals only via said CPU module, whereby an electronic mail system is implemented internally within said communication system.

5. A data interface as defined in claim 3, wherein said data communications module is comprised of at least one modem for modulating data signals received from said at least one terminal via said CPU module and applying said modulated data signals to said outside lines, and demodulating data signals received from said outside lines and transmitting said demodulated data signals to said at least one terminal via said CPU module.

6. A data interface as defined in claim 3 or 4, wherein said data communications module is comprised of at least one Telex TM circuit for bidirectionally translating Telex TM text data signals between said at least one terminal and one or more of said outside lines via said CPU module.

7. A data interface as defined in claim 3 or 4, wherein said CPU module includes means for automatically connecting said communications module to a predetermined one of said outside lines and generating control signals for logging-on said communications module to a communications medium for communicating with a further remote communications module connected to said predetermined outside line.

8. A data interface as defined in claim 1, 3 or 4, further including plural ones of said terminals, a data base connected to said CPU module, and means within said CPU module for interfacing said terminals with said data base on a time sharing basis.

9. A data interface as defined in claim 1, 3 or 4, further including plural ones of said terminals, a personal computer connected to said CPU module, and means within said CPU module for interfacing said terminals with said computer on a time sharing basis.

10. A data interface as defined in claim 1, 3 or 4, further including plural ones of said terminals, a printer connected to said CPU modules, and means within said CPU module for interfacing said terminals with said printer on a time sharing basis.

11. A data interface as defined in claim 1, 2 or 3, further including plural ones of said terminals and wherein said CPU module is further comprised of a microprocessor connected to RAM and EPROM memory circuits, a plurality of UARTS for connection to said terminals, and a dual port RAM circuit for connection to said central controller.

12. A data interface as defined in claim 1, 2 or 3, wherein at least one of said special features includes a means for operating a protocol translation program for translation of signal protocols between one or more computer languages implemented by one or more personal computers connected to said CPU module.

13. A data interface as defined in claim 1, 2 or 3, further including plural ones of said terminals, at least one personal computer associated with at least one corresponding port and connected to said CPU module, and wherein at least one of said special features includes means for operating a protocol translation program for translation of a signal protocol between a proprietary or operating system program language implemented by said CPU module and one or more computer languages implemented by said computers.

* * * * *